(12) United States Patent
Kim et al.

(10) Patent No.: US 10,013,023 B2
(45) Date of Patent: Jul. 3, 2018

(54) ELECTRONIC DEVICE AND METHOD FOR DISASSEMBLING THE ELECTRONIC DEVICE

(71) Applicant: Samsung Electronics Co., Ltd., Suwon-si, Gyeonggi-do (KR)

(72) Inventors: Sun-Ho Kim, Daegu (KR); Chul-Hyung Yang, Gumi-si (KR); Ji-Woo Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/185,858

(22) Filed: Jun. 17, 2016

(65) Prior Publication Data

US 2017/0023973 A1 Jan. 26, 2017

(30) Foreign Application Priority Data

Jul. 23, 2015 (KR) .................. 10-2015-0104326

(51) Int. Cl.
 *G06F 1/16* (2006.01)
 *G06F 1/18* (2006.01)
 *H04M 1/02* (2006.01)

(52) U.S. Cl.
 CPC ............ *G06F 1/1626* (2013.01); *G06F 1/182* (2013.01); *G06F 1/183* (2013.01); *H04M 1/02* (2013.01)

(58) Field of Classification Search
 CPC ........ G06F 1/1626; G06F 1/182; G06F 1/183; H04M 1/02
 See application file for complete search history.

(56) References Cited

U.S. PATENT DOCUMENTS

| | | | |
|---|---|---|---|
| 5,761,982 A * | 6/1998 | Abt .................... | B26D 7/20 83/861 |
| 2013/0034727 A1 | 2/2013 | Casebolt et al. | |
| 2014/0063755 A1* | 3/2014 | Song .................. | H05K 7/02 361/748 |
| 2015/0015462 A1* | 1/2015 | Lee .................... | H04N 13/0402 345/32 |
| 2015/0062823 A1* | 3/2015 | Seo .................... | B32B 38/10 361/704 |
| 2016/0109906 A1* | 4/2016 | Trutna ............... | G02F 1/133308 361/747 |

FOREIGN PATENT DOCUMENTS

KR 10-2014-0035499 A 3/2014

* cited by examiner

*Primary Examiner* — Dimary Lopez Cruz
*Assistant Examiner* — Abishek Rathod
(74) *Attorney, Agent, or Firm* — Jefferson IP Law, LLP

(57) ABSTRACT

An electronic device and a method for disassembling the electronic device are provided. The electronic device includes a housing including at least one of a first plate or a second plate, when the housing includes the first plate and the second plate, the second plate faces in an opposite direction to the first plate, a substrate disposed between the first and second plates in substantially parallel with the first and second plates, a first attachment layer disposed between the first plate and the substrate, and a second attachment layer disposed between the second plate and the substrate. When the first and second attachment layers are seen from above the first plate, the first and second attachment layers overlap with each other at least partially, and one of the first and second attachment layer includes at least one tear line extended at least partially across the one attachment layer.

12 Claims, 11 Drawing Sheets

ELECTRONIC DEVICE AND METHOD FOR DISASSEMBLING THE ELECTRONIC DEVICE

CROSS-REFERENCE TO RELATED APPLICATION(S)

This application claims the benefit under 35 U.S.C. § 119(a) of a Korean patent application filed on Jul. 23, 2015 in the Korean Intellectual Property Office and assigned Serial number 10-2015-0104326, the entire disclosure of which is hereby incorporated by reference.

TECHNICAL FIELD

The present disclosure relates to an electronic device. More particularly, the present disclosure is directed to an electronic device for mitigating or preventing damage to parts thereof during disassembly, while ensuring the structural stability of stacked parts, and a method for disassembling the electronic device

BACKGROUND

In general, an electronic device is a device that executes a specific function according to a loaded program, such as a home appliance, an electronic note, a portable multimedia player (PMP), a mobile communication terminal, a tablet personal computer (PC), a video/audio device, a desktop/laptop computer, an in-vehicle navigator, and the like. For example, these electronic devices may output stored information visually or audibly. Along with an increase in the integration level of electronic devices and the increasing popularity of ultra-high-speed, large-capacity wireless communication, various functions have recently been loaded in a single mobile communication terminal. For example, an entertainment function such as gaming, a multimedia function such as music/video play, a communication and security function for mobile banking, a scheduling function, and an electronic wallet function as well as a communication function have been integrated in a single electronic device.

Along with the increase of the integration level of electronic devices, the electronic devices may be miniaturized gradually, still maintaining the same performance. For example, a television (TV) receiver was generally in the form of a box. Recently, TV receivers have been fabricated to be flat and slim. Traditionally, various types of mobile communication terminals such as a folder type, a slider type, and the like were available. Now, as ultra-high-speed, large-capacity wireless communication is enabled and the multimedia function is reinforced, bar-type terminals having a larger screen and a smaller thickness with the same volume as or a smaller volume than folder-type or slider-type terminals occupy a large proportion in the market.

As electronic devices get thinner, interior parts may be stacked. To ensure structural stability, some parts may be attached to each other. The parts may be disassembled, for repair and maintenance. During the disassembly, attached parts may be damaged due to tension between them.

Moreover, even though first and second attached parts are electrically connected, if the first and second parts are detached from each other during disassembly, a wire that electrically connects the first and second parts to each other may be damaged.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for mitigating or preventing damage to parts during disassembly, while ensuring the structural stability of stacked parts, and a method for disassembling the electronic device.

Another aspect of the present disclosure is to provide an electronic device for mitigating or preventing damage to a part that provides an electrical connection (for example, a flexible printed circuit board (FPCB)) during detachment of attached parts, and a method for disassembling the electronic device.

In accordance with an aspect of the present disclosure, an electronic device is provided. The electronic device includes a housing including at least one of a first plate and a second plate, when the housing includes the first plate and the second plate, the second plate faces in an opposite direction to the first plate, a substrate disposed between the first plate and the second plate in substantially parallel with the first plate and the second plate, a first attachment layer disposed between the first plate and the substrate, and a second attachment layer disposed between the second plate and the substrate. When the first attachment layer and the second attachment layer are seen from above the first plate, the first attachment layer and the second attachment layer overlap with each other at least partially, and one of the first attachment layer and the second attachment layer includes at least one tear line extended at least partially across the one attachment layer, and one attachment layer of the first attachment layer and the second attachment layer includes at least one tear line extended at least partially across the one attachment layer of the first attachment layer and the second attachment layer.

In accordance with another aspect of the present disclosure, a method for disassembling a first plate included in an electronic device, a second plate facing in an opposite direction to the first plate, and a substrate disposed between the first and second plates is provided. The method includes at least partially detaching the first plate and the second plate from each other, at least partially separating a first attachment layer disposed between the first plate and the substrate from the first plate or the substrate, and at least partially separating a second attachment layer from the second plate or the substrate, the second attachment layer being disposed between the second plate and the substrate and at least partially overlapping with the first attachment layer, when seen from above the first plate. One of the first attachment layer and the second attachment layer includes at least one tear line extended at least partially across the one attachment layer, and the one attachment layer is separated earlier than the other attachment layer, and the one attachment layer of the first attachment layer and the second attachment layer is separated earlier than the other attachment layer of the first attachment layer and the second attachment layer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
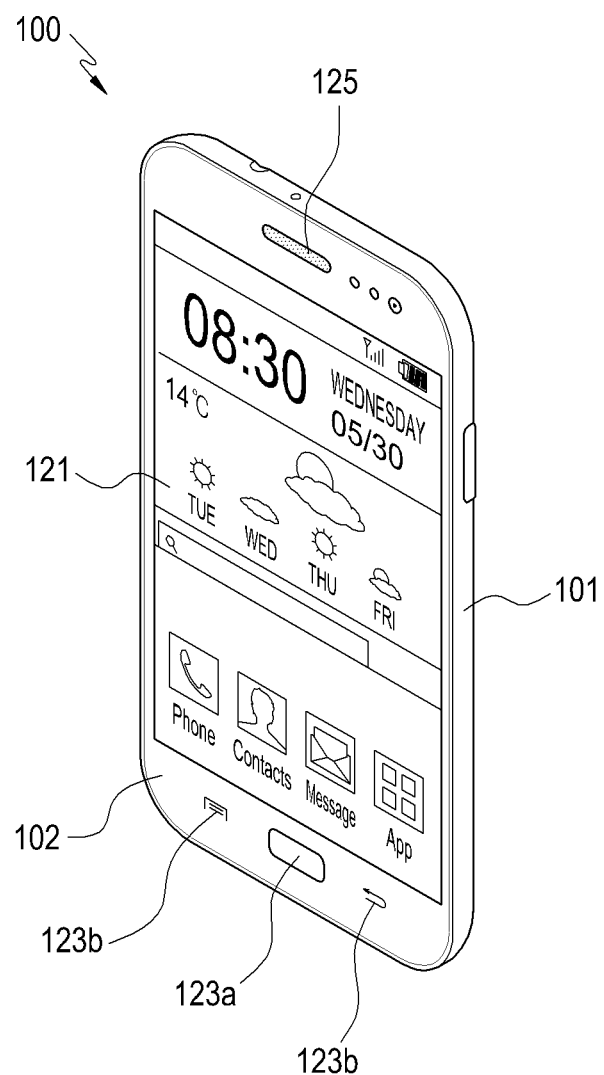
FIG. 1 is a perspective view of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to the present disclosure may be a device with a touch panel. The electronic device may be referred to as a terminal, a portable terminal, a mobile terminal, a communication terminal, a portable communication terminal, a portable mobile terminal, a display device, and the like.

For example, the electronic device may be a smart phone, a portable phone, a navigation device, a game console, a television (TV), an in-vehicle head unit, a laptop computer, a tablet computer, a portable multimedia player (PMP), a personal digital assistant (PDA), and the like. The electronic device may be configured as a pocket-size portable communication terminal with wireless communication functionalities. Also, the electronic device may be a flexible device or a flexible display device.

The electronic device may communicate with an external electronic device such as a server or perform a task through interaction with an external electronic device. For example, the electronic device may transmit an image captured by a camera and/or location information detected by a sensor unit to a server through a network. The network may be, but not limited to, a mobile or cellular communication network, a local area network (LAN), a wireless LAN (WLAN), a wide area network (WAN), the Internet, a small area network (SAN), and the like.

FIG. 1 is a perspective view of an electronic device according to various embodiments of the present disclosure.

Referring to FIG. 1, an electronic device 100 according to various embodiments of the present disclosure may include a housing having a case member 101 and a cover member 102 mounted on the front surface of the case member 101. The cover member 102 may include a view area 121 that transmits a screen received from a display device. A manipulation member 123a may be disposed at a side of the view area 121 on the front surface of the case member 101, for example, on the cover member 102 and thus may be exposed outward from the cover member 102. The manipulation member 123a may include a mechanical key, and other manipulation members (hereinafter, referred to as 'second manipulation members') 123b may be arranged at both sides of the manipulation member 123a. If the second manipulation members 123b generate input signals in response to a user's contact, touch keys may be arranged at positions corresponding to the second manipulation members 123b on an inner surface of the cover member 102. The touch keys may include a capacitive touch sensor or a resistive touch sensor. An opening may be provided at the other side of the view area 121, for example, above the view area 121 to output sounds. A screen 125 formed of a fiber felt or a metal mesh may be mounted in the opening to prevent introduction of foreign materials.

A power key, a sound input hole, or various connector holes may be disposed on a side surface or a top/bottom end surface of the housing 101, which is readily understood to those skilled in the art and thus will not be described herein in detail.

Figure 2:
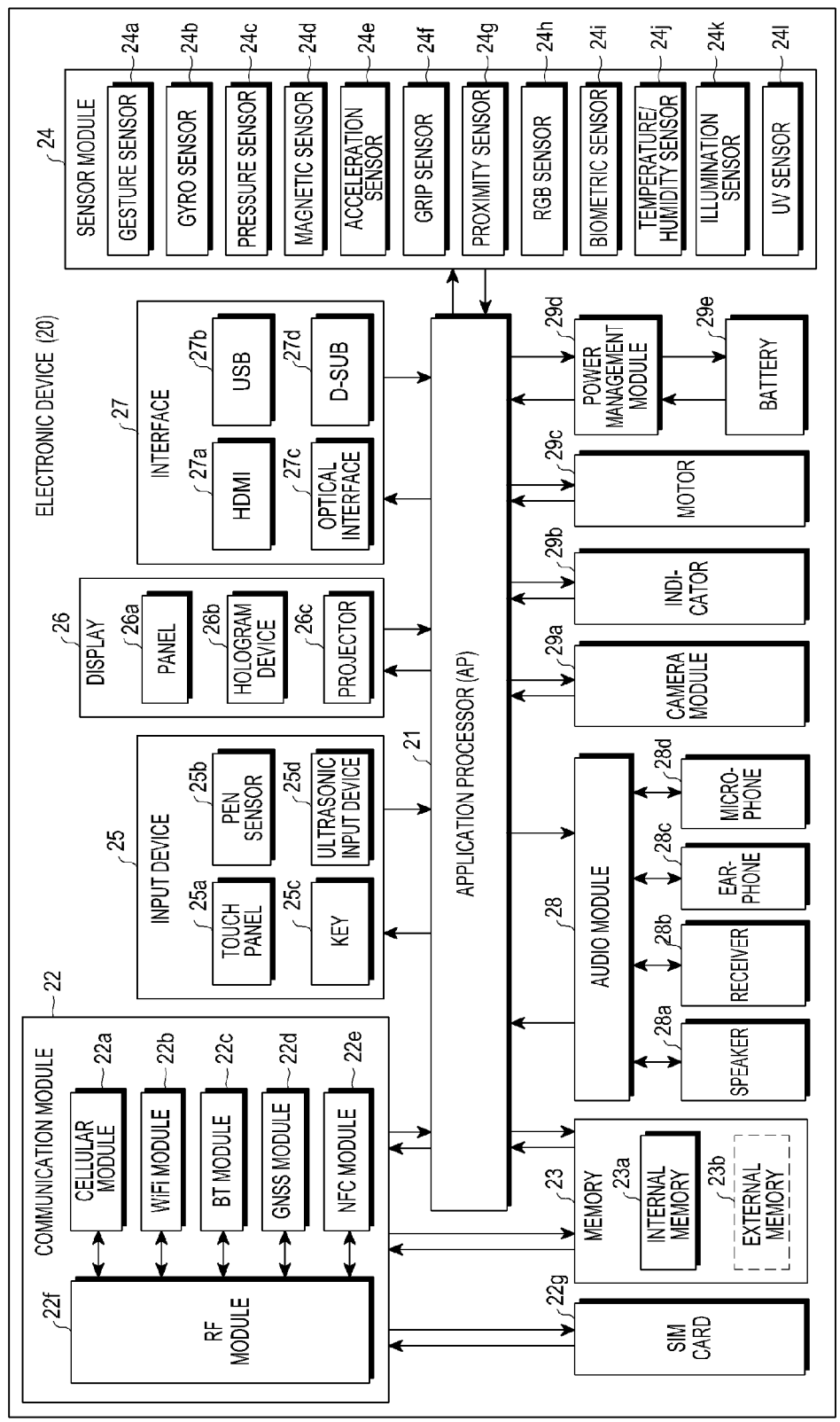
FIG. 2 is a block diagram of an electronic device according to various embodiments of the present disclosure.

FIG. 2 is a block diagram of an electronic device according to various embodiments of the present disclosure.

Referring to FIG. 2, an electronic device 20 may include, for example, the whole or part of the electronic device 100 illustrated in FIG. 1. The electronic device 20 may include at least one processor (for example, application processor (AP)) 21, a communication module 22, a subscriber identification module (SIM) 22g, a memory 23, a sensor module 24, an input device 25, a display 26, an interface 27, an audio module 28, a camera module 29a, a power management module 29d, a battery 29e, an indicator 29b, and a motor 29c.

The processor 21 may, for example, control a plurality of hardware or software components that are connected to the processor 21 by executing an operating system (OS) or an application program and may perform processing or computation of various types of data. The processor 21 may be implemented, for example, as a system on chip (SoC). According to an embodiment of the present disclosure, the processor 21 may further include a graphics processing unit (GPU) and/or an image signal processor (ISP). The processor 21 may include at least a part (for example, a cellular module 22a) of the components illustrated in FIG. 1. The processor 21 may load a command or data received from at least one of other components (for example, a non-volatile memory), process the loaded command or data, and store various types of data in the non-volatile memory.

The communication module 22 may include, for example, the cellular module 22a, a Wi-Fi module 22b, a Bluetooth (BT) module 22c, a global navigation satellite system (GNSS) module 22d (for example, a global positioning system (GPS) module, a GLONASS module, a Beidou module, or a Galileo module), a near field communication (NFC) module 22e, and a radio frequency (RF) module 22f.

The cellular module 22a may provide services such as voice call, video call, short message service (SMS), or the Internet through a communication network. According to an embodiment of the present disclosure, the cellular module 22a may identify and authenticate the electronic device 20 within a communication network, using the SIM (for example, a SIM card) 22g. According to an embodiment of the present disclosure, the cellular module 22a may perform at least a part of the functionalities of the processor 21. According to an embodiment of the present disclosure, the cellular module 22a may include a communication processor (CP).

Each of the Wi-Fi module 22b, the BT module 22c, the GNSS module 22d, and the NFC module 22e may include, for example, a processor that may process data received or transmitted by the respective modules. According to an embodiment of the present disclosure, at least a part (for example, two or more) of the cellular module 22a, the Wi-Fi module 22b, the BT module 22c, the GNSS module 22d, and the NFC module 22e may be included in a single integrated chip (IC) or IC package.

The RF module 22f may transmit and receive communication signals (for example, RF signals). The RF module 22f may include, for example, a transceiver, a power amplifier module (PAM), a frequency filter, a low noise amplifier (LNA), an antenna, and the like. According to an embodiment of the present disclosure, at least one of the cellular module 22a, the Wi-Fi module 22b, the BT module 22c, the GNSS module 22d, and the NFC module 22e may transmit and receive RF signals via a separate RF module.

The SIM 22g may include, for example, a card including the SIM and/or an embedded SIM. The SIM 22g may include a unique identifier (for example, integrated circuit card identifier (ICCID)) or subscriber information (for example, international mobile subscriber identity (IMSI)).

The memory 23 may include, for example, an internal memory 23a or an external memory 23b. The internal memory 23a may be at least one of, for example, a volatile memory (for example, dynamic random access memory (DRAM), static RAM (SRAM), or synchronous DRAM (SDRAM)), a non-volatile memory (for example, one time programmable read only memory (OTPROM), PROM, erasable and programmable ROM (EPROM), electrically erasable and programmable ROM (EEPROM), mask ROM, flash ROM, flash memory (for example, NAND flash memory, or NOR flash memory), a hard drive, and a solid state drive (SSD).

The external memory 23b may further include, for example, a flash drive such as a compact flash (CF) drive, a secure digital (SD), a micro-SD, a mini-SD, an extreme digital (xD), a multi-media card (MMC), or a memory stick. The external memory 23b may be operatively and/or physically coupled to the electronic device 20 via various interfaces.

The sensor module 24 may, for example, measure physical quantities or detect operational states associated with the electronic device 20, and convert the measured or detected information into electric signals. The sensor module 24 may include at least one of, for example, a gesture sensor 24a, a gyro sensor 24b, an atmospheric pressure sensor 24c, a magnetic sensor 24d, an accelerometer 24e, a grip sensor 24f, a proximity sensor 24g, a color sensor (for example, a red, green, blue (RGB) sensor) 24h, a biometric sensor 24i, a temperature/humidity sensor 24j, an illumination sensor 24k, and an ultra violet (UV) sensor 24l. Additionally or alternatively, the sensor module 24 may include, for example, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor. The sensor module 24 may further include a control circuit for controlling one or more sensors included therein. According to various embodiments of the present disclosure, the electronic device 20 may further include a processor configured to control the sensor module 24, as a part of or separately from the processor 21. Thus, while the processor 21 is in a sleep state, the control circuit may control the sensor module 24.

The input device 25 may include a touch panel 25a, a (digital) pen sensor 25b, a key 25c, or an ultrasonic input device 25d. The touch panel 25a may operate in at least one of, for example, capacitive, resistive, infrared, and ultrasonic methods. The touch panel 25a may further include a control circuit. The touch panel 25a may further include a tactile layer to thereby provide haptic feedback to the user.

The (digital) pen sensor 25b may include, for example, a detection sheet which is a part of the touch panel or separately configured from the touch panel. The key 25c may include, for example, a physical button, an optical key, or a keypad. The ultrasonic input device 25d may be a device configured to identify data by detecting, using a microphone (for example, a microphone 28d), ultrasonic signals generated by an input tool capable of generating the ultrasonic signals.

The display 26 may include a panel 26a, a hologram device 26b, or a projector 26c. The panel 26a may be configured to be, for example, flexible, transparent, or wearable. The panel 26a and the touch panel 25a may be implemented as a single module. The hologram device 26b may utilize the interference of light waves to provide a three-dimensional image in empty space. The projector 26c may provide an image by projecting light on a screen. The screen may be positioned, for example, inside or outside the electronic device 20. According to an embodiment of the present disclosure, the display 26 may further include a control circuit for controlling the panel 26a, the hologram device 26b, or the projector 26c.

The interface 27 may include, for example, a high-definition multimedia interface (HDMI) 27a, a universal serial bus (USB) 27b, an optical interface 26c, or a D-sub-miniature (D-sub) 27d. The interface 27 may include, for example, a mobile high-definition link (MHL) interface, an SD/MMC interface, or an infrared data association (IrDA) interface.

The audio module 28 may convert a sound to an electrical signal, and vice versa. The audio module 28 may process sound information input into, or output from, for example, a speaker 28a, a receiver 28b, an earphone 28c, or the microphone 28d.

The camera module 29a may capture, for example, still images and a video. According to an embodiment of the present disclosure, the camera module 29a may include one or more image sensors (for example, a front sensor or a rear sensor), a lens, an ISP, or a flash (for example, a light emitting diode (LED) or a xenon lamp).

The power management module 29d may manage power of the electronic device 20. According to an embodiment of the present disclosure, the power management module 29d may include a power management IC (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may use additional circuits for wireless charging, such as a coil loop, a resonance circuit, or a rectifier. The battery gauge may measure, for example, a charge level, a voltage while charging, current, or temperature of the battery 29e. The battery 29e may include, for example, a rechargeable battery and/or a solar battery.

The indicator 29b may indicate specific states of the electronic device 20 or a part of the electronic device 100 (for example, the processor 21), for example, boot status, message status, or charge status. The motor 29c may convert an electrical signal into a mechanical vibration and generate vibrations or a haptic effect. While not illustrated, the electronic device 20 may include a device for supporting mobile TV (for example, a GPU). The device for supporting mobile TV may process media data compliant with, for example, digital multimedia broadcasting (DMB), digital video broadcasting (DVB), or MediaFLO™.

Each of the above-described components of the electronic device may include one or more parts and the name of the component may vary with the type of the electronic device. According to various embodiments of the present disclosure, the electronic device may be configured to include at least one of the afore-described components. Some component may be omitted from or added to the electronic device. According to various embodiments of the present disclosure, one entity may be configured by combining a part of the components of the electronic device, to thereby perform the same functions of the components prior to the combining.

The term "module" as used herein may include its ordinary meaning including, for example, a unit of one, or a combination of two or more. The term "module" may be used interchangeably with terms such as, for example, unit, logic, logical block, component or circuit. A "module" may be the smallest unit for performing one or more functions, or a portion thereof. A "module" may be implemented mechanically, or electronically. For example, a "module" may include at least one of a known, or to-be-developed, application-specific IC (ASIC) chip, field-programmable gate array (FPGA) or programmable logic device that perform certain operations.

At least a part of devices (for example, modules and their functions) or methods (for example, operations) according to various embodiments of the present disclosure may be implemented as commands stored in a computer-readable storage medium, in the form of a programming module. When the commands are executed by a processor, one or more processors may execute functions corresponding to the commands. The computer-readable storage medium may be, for example, a memory.

The computer-readable recording medium may include hard disk, floppy disk, magnetic media (for example, magnetic tape), optical media (for example, compact disc ROM (CD-ROM)), digital versatile disc (DVD), magneto-optical media (for example, floptical disk), hardware devices (for example, ROM, RAM or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

Figure 3:
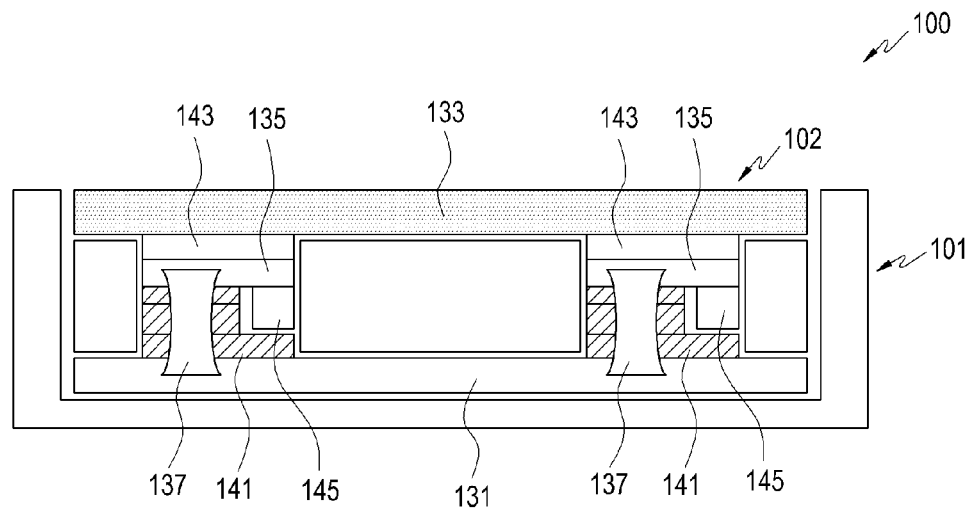
FIG. 3 is a sectional view of an electronic device according to various embodiments of the present disclosure.

FIG. 3 is a sectional view of an electronic device according to various embodiments of the present disclosure.

Referring to FIG. 3, the electronic device 100 may include a substrate 135 between first and second plates 131 and 133 in an interior space of the housing, for example, an interior space formed between the case member 101 and the cover member 102. To fix the substrate 135 at a specific position, a first attachment layer 141 may be interposed between the substrates 135 and the first plate 131 and a second attachment layer 143 may be interposed between the substrate 135 and the second plate 133 in this stack structure.

According to various embodiments of the present disclosure, the substrate 135 may include the afore-described touch keys, or a heat resistant sheet or shielding sheet applied onto a display device or other electronic parts. If the substrate 135 includes touch keys, an illumination device, for example, a light source 145 may be disposed under the substrate 135 to thereby illuminate the second manipulation members 123b. The touch keys may include a capacitive touch sensor or a resistive touch sensor. If the electronic device 100 is wearable, a sensor for detecting a worn state (for example, a pressure sensor) may be included in the substrate 135. If the substrate 135 includes a pressure sensor, the substrate 135 may be disposed near to an outer surface of the case member 101 or to be at least a part of the outer surface of the case member 101. If the substrate 135 includes a heat resistant sheet, the substrate 135 may be attached to an electronic part that emits heat, such as a display device or an IC chip, and may diffuse or discharge the generated heat. If the substrate 135 includes a shieling sheet, the substrate 135 may shield an electric field generated from electronic parts inside the electronic device 100, thus preventing interference between electronic parts or malfunction of the electronic parts.

According to an embodiment of the present disclosure, the first plate 131 may be a circuit board electrically connected to the substrate 135. For example, a main circuit board or an auxiliary circuit board of the electronic device 100 may be included in the first plate 131. According to various embodiments of the present disclosure, the first plate 131 may be a part of the housing, for example, a part of the case member 101. Or the first plate 131 may include the afore-described touch keys, pressure sensor, heat resistant sheet, or shielding sheet. In a specific embodiment of the present disclosure, the substrate 135 is configured as touch keys and the first plate 131 is configured as a circuit board, by way of example. The substrate 135 may be electrically connected to the first plate 131 via a connection member 137 such as a flexible printed circuit board (FPCB).

The second plate 133 may be disposed facing the first plate 131. The substrate 135 may be disposed between the first and second plates 131 and 133, substantially in parallel with the first and second plates 131 and 133. The second plate 133 may be a part of the housing, for example, a part of the cover member 102. According to various embodiments of the present disclosure, the second plate 133 may include the afore-described touch keys, pressure sensor, heat resistant sheet, or shielding sheet. If the electronic device 100 has a touch screen function, a touch panel may be disposed on an inner surface of the cover member 102. The touch panel may be included in the second plate 133. If the second plate 133 includes an electronic part such as a touch panel, the substrate 135 may be electrically connected to the second plate 133 via an FPCB. For example, the substrate 135 may be electrically connected to one of the first and second plates 131 and 133 according to the arrangement or coupling relationship of the first and second plates 131 and 133 and the substrate 135.

The first and second attachment layers 141 and 143 may be interposed between the substrate 135 and the first plate 131 and between the substrate 135 and the second plate 133, respectively. For example, an adhesive material may be applied onto both surfaces of the substrate 135 and thus the substrate 135 may be attached to the first and second plates 131 and 133. As seen from above the first or second plate 131 or 133, the first attachment layer 141 between the substrate 135 and the first plate 131 and the second attachment layer 143 between the substrate 135 and the second plate 133 may at least partially overlap with each other. For example, when the electronic device 100 is seen from the front or the rear, the first and second attachment layers 141 and 143 may at least partially overlap with each other.

A tear line may be formed on one of the first and second attachment layers 141 and 143, as described later in more detail with reference to FIG. 6. The tear line may be formed across at least a part of one of the first and second attachment layers 141 and 143 by partially eliminating an adhesive material that forms the first and second attachment layers 141 and 143. For example, the tear line may include perforations arranged in a substantially continuously extended line or specific trace.

Some of a plurality of parts may be damaged during disassembly of the stack structure of the parts in the electronic device 100. For example, if an FPCB structure-based touch key is disposed and then attached between a window and a support member (or a circuit board), the touch key may be damaged during separation of the window from the support member. This structure of an electronic device 100 will be described in greater detail with reference to FIGS. 4 and 5.

Figure 4:
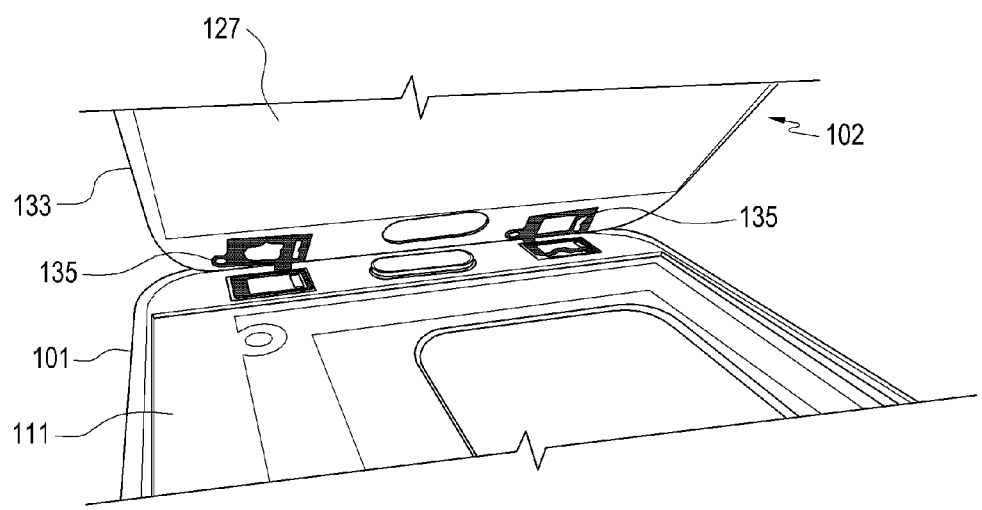
FIG. 4 illustrates an operation for disassembling an electronic device according to various embodiments of the present disclosure.

FIG. 4 illustrates an operation for disassembling an electronic device according to various embodiments of the present disclosure.

Referring to FIG. 4, touch keys into which the substrate 135 is configured may be disposed between a circuit board or support member 111 formed as the first plate (which may be included as a part of the case member) and the cover member 102 formed as the second plate 133. A display device 127 corresponding to a view area may be provided on the inner surface of the cover member 102, and the touch keys, for example, the substrate 135 may be arranged near to one side of the display device 127. The substrate 135 may be attached respectively to the first and second plates, for example, the support member 111 and/or the cover member 102 by means of attachment layers (for example, the first and second attachment layers 141 and 143). The substrate 135 attached to the support member 111 by a first attachment layer (for example, the first attachment layer 141) may be electrically or mechanically connected to the support member 111 or the circuit board by means of a connection member (for example, the connection member 137).

In the above structure of the electronic device 100, it may be preferred to detach the substrate 135 from the second plate 133, for example, the cover member 102, maintaining the substrate 135 attached to the support member 111 in the process of separating the cover member 102, for example, the second plate 133 from the support member 111. For example, since the substrate 135 is electrically or mechanically connected to the support member 111 or the circuit board inside the case member 101, if the substrate 135 is separated from the support member 111, while being attached to the second plate 133, the connection member (for example, the connection member 137) may be cut or wires of the connection member 137 may be damaged. In the above structure of an electronic device 100, it may be preferred to separate the substrate 135 from the second plate 133, while keeping the substrate 135 attached to the support member 111, in the process of separating the cover member 102 from the support member 111.

However, if an adhesive force is not appropriately designed between the cover member 102 and the substrate 135 and/or between the support member 111 and the substrate 135, if an adhesive material gets altered under the use environment of the electronic device 100 despite an appropriately designed adhesive force, or according to the direction or magnitude of a force applied during disassembly, the substrate 135, for example, the touch keys and/or the connection member (for example, the connection member 137) may be damaged, thereby increasing service cost during repair or maintenance such as part replacement.

Figure 5:
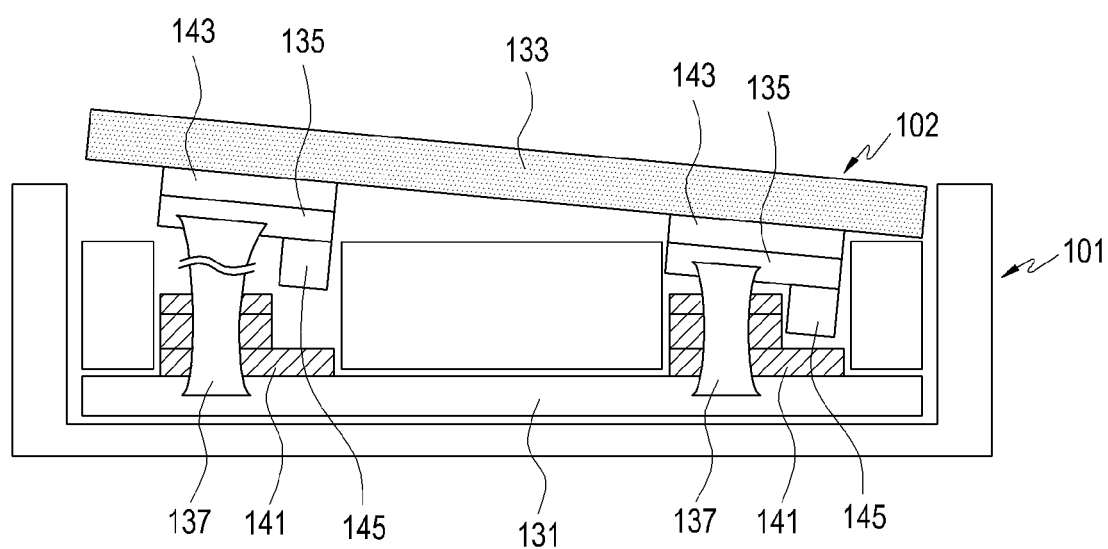
FIG. 5 is a sectional view illustrating an operation for disassembling an electronic device according to various embodiments of the present disclosure.

FIG. 5 is a sectional view illustrating an operation for disassembling an electronic device according to various embodiments of the present disclosure.

Referring to FIG. 5, the substrate 135 including a touch key, a heat resistant sheet, or a shielding sheet may be interposed between the first plate 131 including the afore-described circuit board or support member 111 (which may be included as a part of the case member 101) and the second plate 133 including the afore-described cover member 102. If the substrate 135 includes a touch key, the touch key may be disposed near to one side of the afore-described display device 127. If the substrate 135 includes a heat resistant sheet and/or a shielding sheet, the heat resistant sheet and/or the shielding sheet may be disposed, at least partially overlapping with the display device 127.

The substrate 135 may be attached to the first and second plates 131 and 133 by means of the first and second attachment layers 141 and 143, respectively. The substrate 135 attached to the first plate 131 by the first attachment layer 141 may be electrically or mechanically connected to the first plate 131, for example, the afore-described support member 111 or circuit board via the connection member 137 inside the case member 102.

In the above structure of the electronic device 100, it may be preferred to detach the substrate 135 from the second plate 133, maintaining the substrate 135 attached to the first plate 131 in the process of separating the second plate 133 from the first plate 131. For example, since the substrate 135 is electrically or mechanically connected to the first plate 131 by means of the connection member 137, if the substrate 135 is detached from the first plate 131, while being attached to the second plate 133, the connection member 137 may be cut or a wire of the connection member 137 may be damaged. In the above structure of the electronic device 100, it may be preferred to separate the substrate 135 from the second plate 133, while keeping the substrate 135 attached to the first plate 131, in the process of separating the second plate 133 from the first plate 131

If the adhesive forces of the first and second attachment layers are not appropriately designed, if an adhesive material gets altered under the use environment of the electronic device 100 despite appropriately designed adhesive forces, or according to the direction or magnitude of a force applied during disassembly, the second plate 133 with the substrate 135 attached thereto may be separated from the first plate 131. As a result, the substrate 135, for example, the touch key may be damaged, thereby increasing service cost during repair or maintenance such as part replacement.

According to various embodiments of the present disclosure, a tear line may be formed on one of the first and second attachment layers 141 and 143, so that the attachment layer having the tear line may be detached from the substrate 135 to prevent damage to the substrate 135 such as a touch key. Or while an adhesive force enough to maintain the structural stability of the substrate 135 is provided in the electronic device 100, a tension applied to the substrate 135 may be mitigated or prevented during separation or disassembly for repair and maintenance. For example, damage to the substrate 135 or electrical wires formed in the substrate 135 may be prevented during separation or disassembly. The configuration of an electronic device 100 having the above attachment structure will be described in greater detail with reference to FIG. 6.

Figure 6:
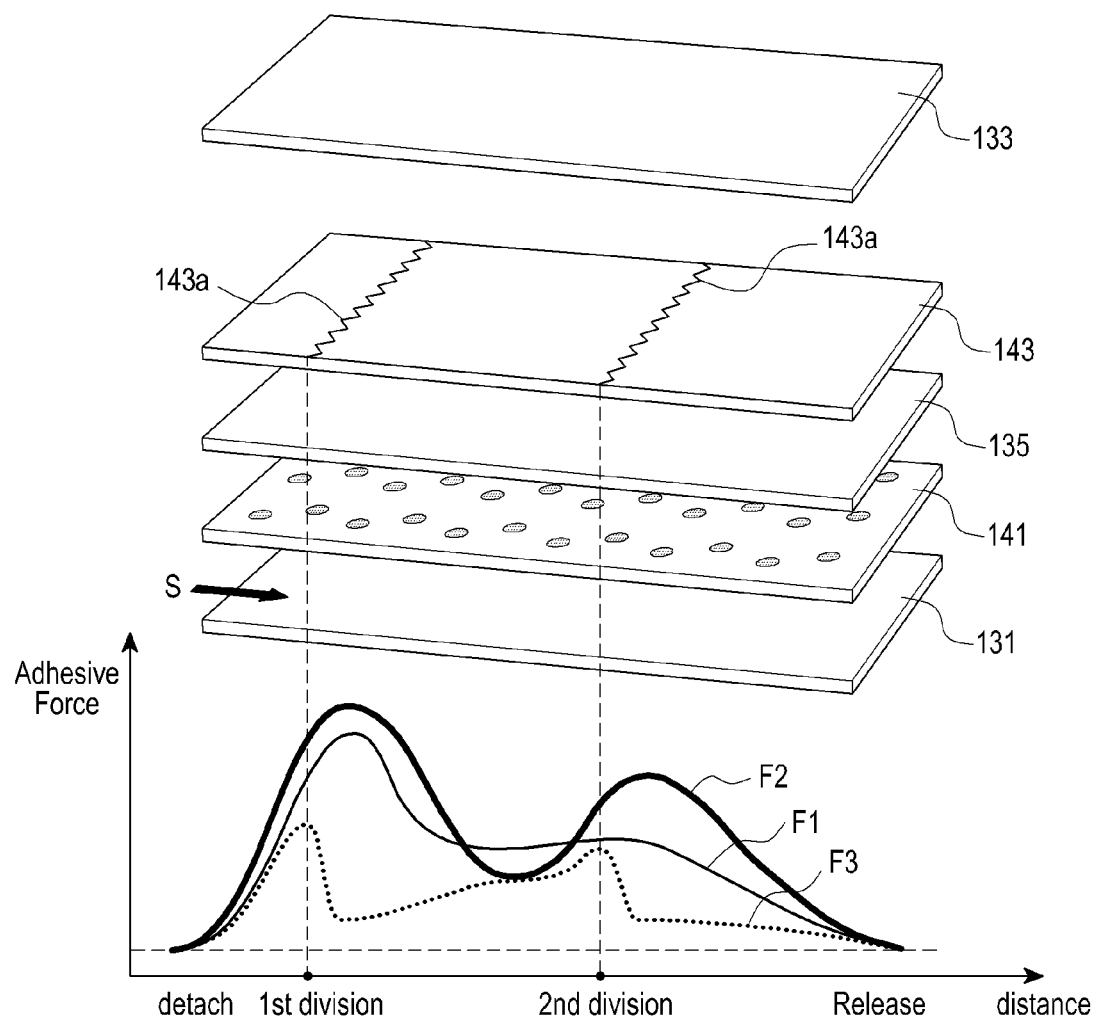
FIG. 6 is a schematic view illustrating an attachment structure of an electronic device according to various embodiments of the present disclosure.

FIG. 6 is a schematic view illustrating an attachment structure of an electronic device according to various embodiments of the present disclosure.

Figure 7:
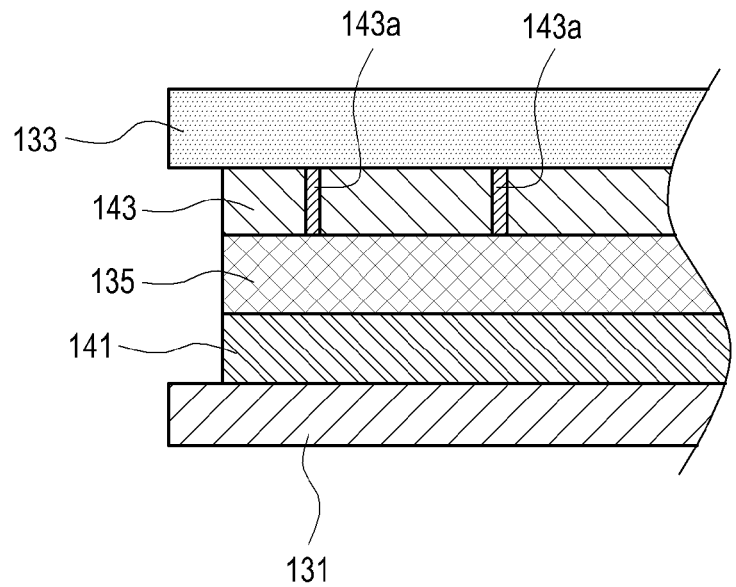
FIG. 7 is a sectional view illustrating an attachment structure of an electronic device according to various embodiments of the present disclosure.

FIG. 7 is a sectional view illustrating the attachment structure of an electronic device according to various embodiments of the present disclosure.

Referring to FIGS. 6 and 7, an electronic device according to various embodiments of the present disclosure (for example, the electronic device 100 illustrated in FIG. 1) includes the first and second attachment layers 141 and 143. Therefore, the substrate 135 may be attached to the first and second plates 131 and 133, respectively.

According to an embodiment of the present disclosure, at least one tear line may be extended at least partially across one of the first and second attachment layers 141 and 143. For example, tear lines 143a may be extended in the form of substantially continuous lines or in parallel with each other. Each of the tear lines 143a is illustrated as extended in a zigzag line, by way of example, which should not be construed as limiting the present disclosure. For example, the tear lines 143a may be straight lines, free curves, or closed loops. For example, if the tear lines 143a are closed loops, the closed loops may be drawn by combining a circle, a polygon, a straight line, and a curve.

A graph illustrated in FIG. 6 illustrates changes in adhesive forces provided by the first and second attachment layers 141 and 143, when the substrate 135 gets detached gradually from the first and second plates 131 and 133 in a direction from one end to the other end, for example, in a direction S from the leftmost end to the rightmost end. In the graph, 'F1' represents changes in the adhesive force provided by the first attachment layer 141, 'F2' represents changes in the adhesive force provided by the second attachment layer 143 that does not include the one or more tear lines 143a, and 'F3' represents changes in the adhesive force provided by the second attachment layer 143 that includes the one or more tear lines 143a. The changes of the adhesive forces may mean changes in forces required to detach, for example, the first and second plates 131 and 133 from each other during separation of the substrate 135 from the first and second plates 131 and 133.

According to an embodiment of the present disclosure, the second attachment layer 143 may exert a stronger adhesive force than the first attachment layer 141, although different in areas in a structure without the tear lines 143a. In this case, if the first and second plates 131 and 133 are detached from each other to separate the substrate 135 from the first and second plates 131 and 133, the first attachment layer 141 may first be separated from the substrate 135 or the first plate 131 and the substrate 135 may be separated from the first plate 131.

It has been stated that the substrate 135 may be mechanically or electrically connected to the first plate 131. In the case where the substrate 135 is mechanically or electrically connected to the first plate 131, if the substrate 135 is first separated from the first attachment layer 141, a mechanical or electrical connection structure (for example, the connection member 137 such as an FPCB, as illustrated in FIG. 5) between the substrate 135 and the first plate 131 may be damaged. According to various embodiments of the present disclosure, when an attachment structure is formed in the above stack structure, the electronic device 100 may be configured so as to have the tear lines 143a on an intended attachment layer to be first separated (for example, the second attachment layer 143) and thus to provide a weaker adhesive force through the attachment layer than through the other attachment layer during detachment of the first plate 131 from the second plate 133.

Adhesive forces exerted by the first and second attachment layers 141 and 143 may change gradually across areas during detachment of the first plate 131 from the second plate 133 in the direction S from one end to the other end. The attachment layer with the tear lines 143 may exert a weaker adhesive force during detachment of the first plate 131 from the second plate 133. For example, the tear lines 143a may be formed on an intended attachment layer to be first separated, when the substrate 135 is to be removed.

In the process of removing the second plate 133, the second attachment layer 143 may exert a threshold adhesive force in each of some plural areas. The threshold adhesive force is an adhesive force at the moment an increased adhesive force starts to decrease along the separation direction S. The second attachment layer 143 with the tear lines 143a may exert a threshold adhesive force (for example, an adhesive force weaker than that of the second attachment layer 143 without the tear lines 143a) at points in which the tear lines 143a are formed. The threshold adhesive force caused by the tear lines 143a is weaker than the adhesive force exerted by the first attachment layer 141. Therefore, when the substrate 135 is to be separated from the first and second plates 131 and 133, the substrate 135 may be induced to be first separated from the second attachment layer 143.

The tear lines 143a may be formed before a point at which the threshold adhesive force is generated, on the adhesive force change curve indicated by 'F2'. For example, if the first and second plates 131 and 133 are detached from each other, starting from the leftmost end in the structure illustrated in FIG. 6, at least one tear line 143a may be formed between the leftmost end of the attachment structure and the threshold adhesive force-generation point of the adhesive force change curve indicated by 'F2'. According to various embodiments of the present disclosure, since at least one tear line 143a is formed in an area where the adhesive force increases gradually in the separation direction S on the curve indicated by 'F2', the adhesive force of the second attachment layer 143 may be kept weaker than the adhesive force of the first attachment layer 141 in the overall attachment structure.

For example, the electronic device 100 according to various embodiments of the present disclosure may keep one of a plurality of attachment layers (for example, the first and second attachment layers 141 and 143 illustrated in FIG. 6) less adhesive than other attachment layers by forming a tear line (for example, the tear lines 143a illustrated in FIG. 6) in the structure of stacking and attaching a plurality of parts (for example, the first and second plates 131 and 133 and the substrate 135 illustrated in FIG. 6). When the stacked and attached parts are separated from each other, the designed attachment layer (for example, the attachment layer with the tear line) is induced to be first separated. Accordingly, damage to each part may be mitigated or prevented during disassembly.

According to an embodiment of the present disclosure, although the threshold adhesive force is decreased by forming the tear lines 143a, an adhesive force that fixes the substrate 135 to the first or second plate 131 or 133 may be maintained. For example, an adhesive force may be changed or a threshold adhesive force may be controlled, as described before with reference to FIG. 6, during forced detachment between the first and second plates 131 and 133. For example, the adhesive force is changed during forced separation between the first and second plates 131 and 133 for repair or maintenance. Even though the tear lines 143a are formed on one of the first and second attachment layers 141 and 143, the substrate 135 may be kept stably attached to the first and second plates 131 and 133 in an ordinary use environment of a user.

Figure 8:
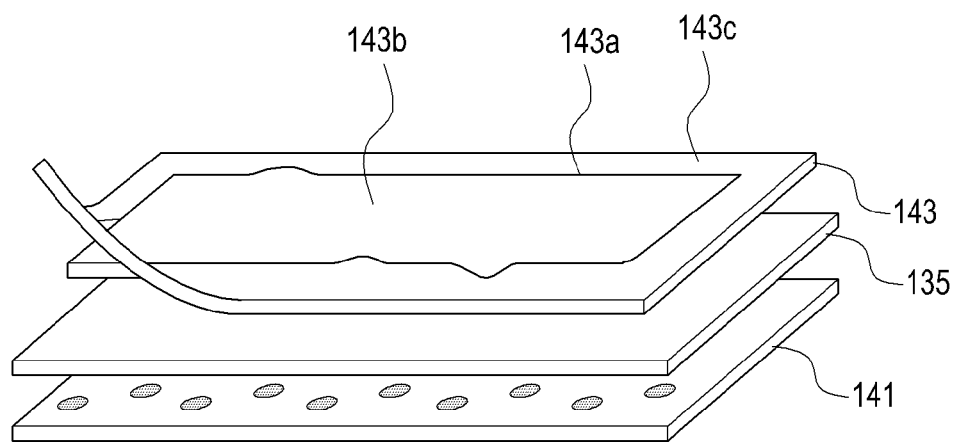
FIG. 8 is a schematic view illustrating an attachment structure of an electronic device according to an embodiment of the present disclosure.

FIG. 8 is a schematic view illustrating an attachment structure of the electronic device according to an embodiment of the present disclosure.

Figure 9:
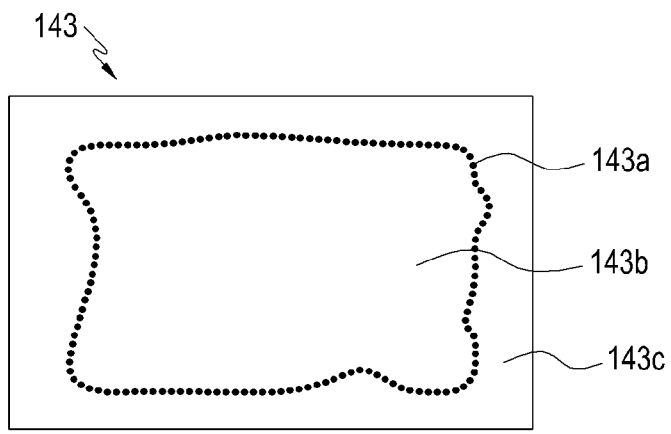
FIG. 9 is a plan view of one of attachment layers in an electronic device according to an embodiment of the present disclosure.

FIG. 9 is a plan view of one of attachment layers in the electronic device 100 according to an embodiment of the present disclosure.

Referring to FIGS. 8 and 9, an attachment structure of the electronic device 100 according to an embodiment of the present disclosure may include the attachment layers 141 and 143 on both surfaces of the substrate 135, and one of the attachment layers 141 and 143 may include a tear line 143a shaped into a closed loop. The tear line 143a may be extended in a substantially continuous line or may include a plurality of perforations arranged along a specific trace (for example, a closed loop trace). In the foregoing embodiment of the present disclosure, the tear line(s) 143a may include perforations arranged in a straight line, a zigzag line, or a closed loop. The tear line 143a may be a tear line 143a illustrated in FIG. 6.

An attachment layer including the closed-loop tear line 143a, that is, the second attachment layer 143 may include a first part 143b surrounded by the tear line 143a, and a second part 143c outside the tear line 143a. According to various embodiments of the present disclosure, the single closed-loop tear line 143a is formed, by way of example. However, a plurality of tear lines may be formed in closed loops on a single attachment layer. For example, more tear lines may be formed depending on the number of points generating a threshold adhesive force or the adhesive force of an adhesive material used for formation of the first and second attachment layers 141 and 143 in the process of detaching the first and second plates 131 and 133 attached by the first and second attachment layers 141 and 143 from each other.

According to an embodiment of the present disclosure, the tear lines 143a are extended from one side to the other side of the attachment structure, for example, the second attachment layer 143 and arranged in the direction S of gradually detaching the first and second plates 131 and 133 from each other, for example, a direction from the leftmost end to the rightmost end in the figure. With this arrangement of the tear lines 143a (for example, the direction (S in FIG. 6) of gradually detaching the first and second plates 131 and 133 from each other crosses the direction of extending the tear lines 143a), the change of an adhesive force provided in the process of detaching the first and second plates 131 and 133 from each other may be controlled.

The first and second plates 131 and 133 may be detached from each other in a direction different from the direction illustrated in FIG. 6 during separation of the first and second plates 131 and 133 or the substrate 135 for repair or maintenance of the electronic device 100. If the direction S of detaching the first and second plates 131 and 133 from each other does not appropriately cross the direction in which the tear lines 143 are extended in a straight line or a zigzag line, the effect achieved by the tear lines 143a (for example, the effect of controlling a change in the adhesive force during separation) may be reduced.

For example, since the direction of extending the tear lines 143a is almost perpendicular to the direction of detaching or separating the first and second plates 131 and 133 from each other, the threshold adhesive force provided by the second attachment layer 143 may be decreased. According to various embodiments of the present disclosure, the direction S of detaching or separating the first and second plates 131 and 133 from each other may be different from the direction S illustrated in FIG. 6. For example, the direction S of detaching or separating the first and second plates 131 and 133 from each other may be parallel with the direction of extending the tear lines 143a according to the way a repairer repairs the electronic device 100. In this case, the effect achieved by forming the tear lines 143a (for example, the effect of reducing the threshold adhesive force) may be decreased.

In the embodiment of the present disclosure illustrated in FIGS. 8 and 9, the closed-loop tear line 143a is formed by setting a trace for the tear line in a direction of detaching the first and second plates 131 and 133 and arranging perforations along the trace or forming a substantially continuous line along the trace. A layout of points at which the tear line is formed has been described before with reference to FIG. 6. Thus, the adhesive force provided by the second attachment layer 143 may be kept weaker than the adhesive force provided by the first attachment layer 141 irrespective of the direction of detaching the first and second plates 131 and 133 from each other in the process of detaching the first and second plates 131 and 133 from each other.

Figure 10:
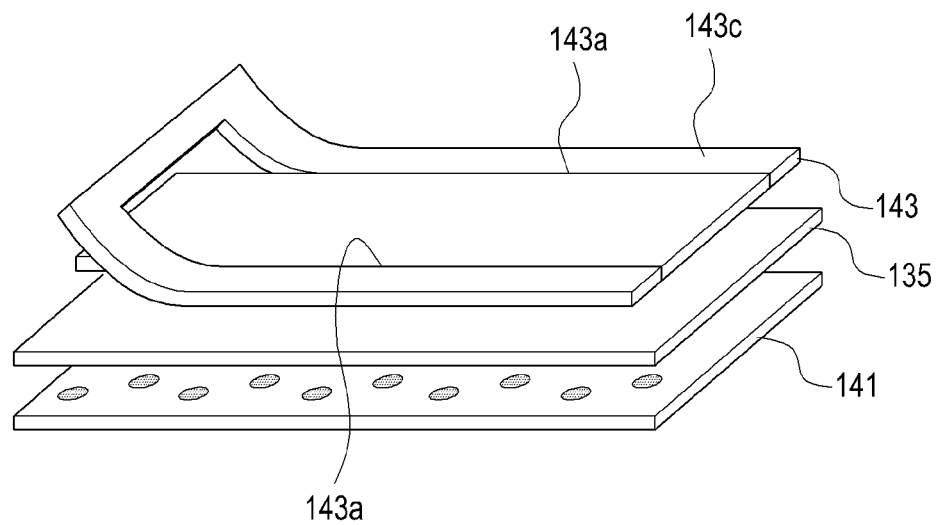
FIG. 10 is a schematic view illustrating an attachment structure of an electronic device according to an embodiment of the present disclosure.

FIG. 10 is a schematic view illustrating an attachment structure of an electronic device according to an embodiment of the present disclosure.

Figure 11:
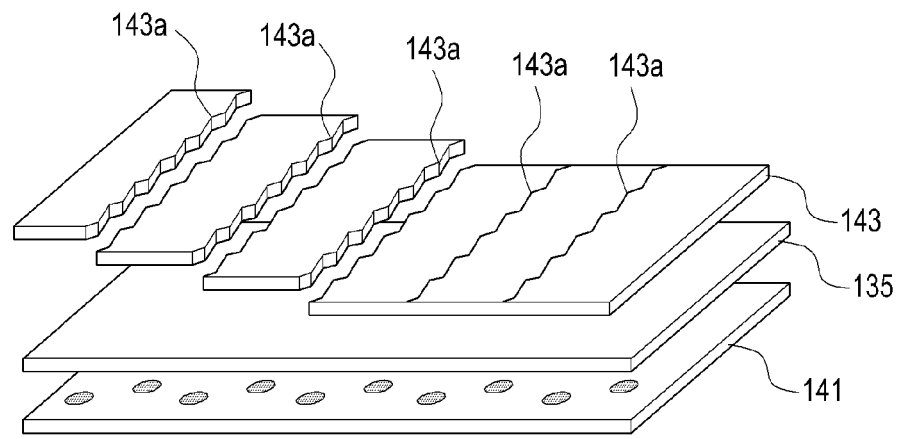
FIG. 11 is a schematic view illustrating an attachment structure of an electronic device according to an embodiment of the present disclosure.

FIG. 11 is a schematic view illustrating an attachment structure of an electronic device according to an embodiment of the present disclosure.

Referring to FIGS. 10 and 11, the number, extended traces, or layout of tear lines 143a may vary according to embodiments of the present disclosure. For example, the tear line 143a may be extended in parallel with a part of the periphery of the second attachment layer 143. A partial area of the second attachment layer 143 cut along the tear line 143a may be shaped into 'U', 'L', or 'I'.

Or a plurality of tear lines 143a may be arranged in one direction on the second attachment layer 143. The number or positions of the tear lines 143a may vary depending on the number and positions of points at which the threshold adhesive force is generated or the magnitude of the threshold adhesive force, as illustrated in FIG. 11.

Figure 12:
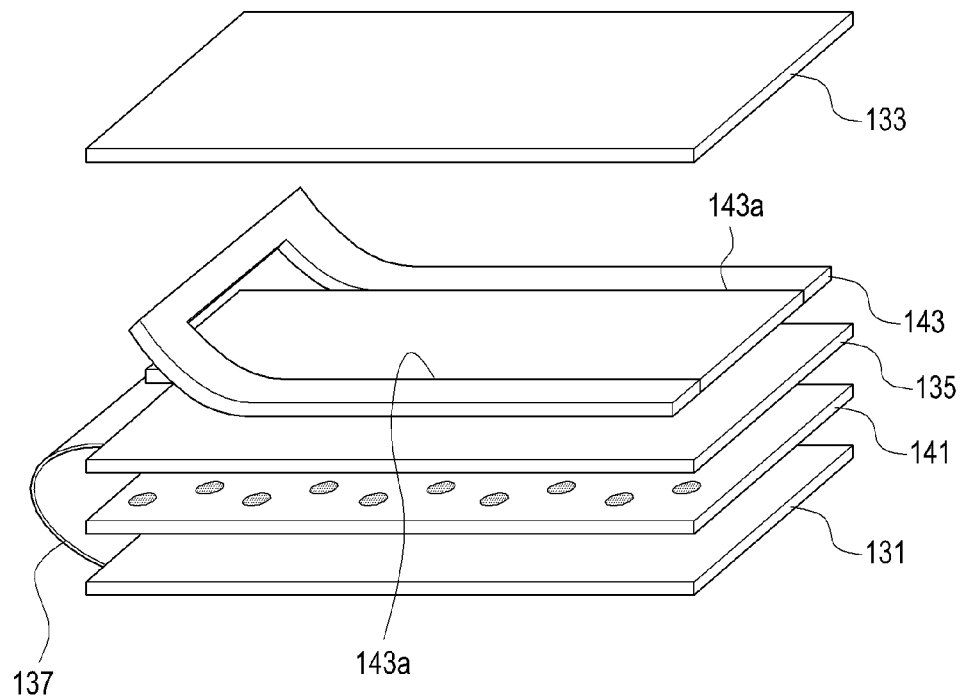
FIG. 12 is a schematic view illustrating an attachment structure of an electronic device according to an embodiment of the present disclosure.

FIG. 12 is a schematic view illustrating an attachment structure of an electronic device according to an embodiment of the present disclosure.

Figure 13:
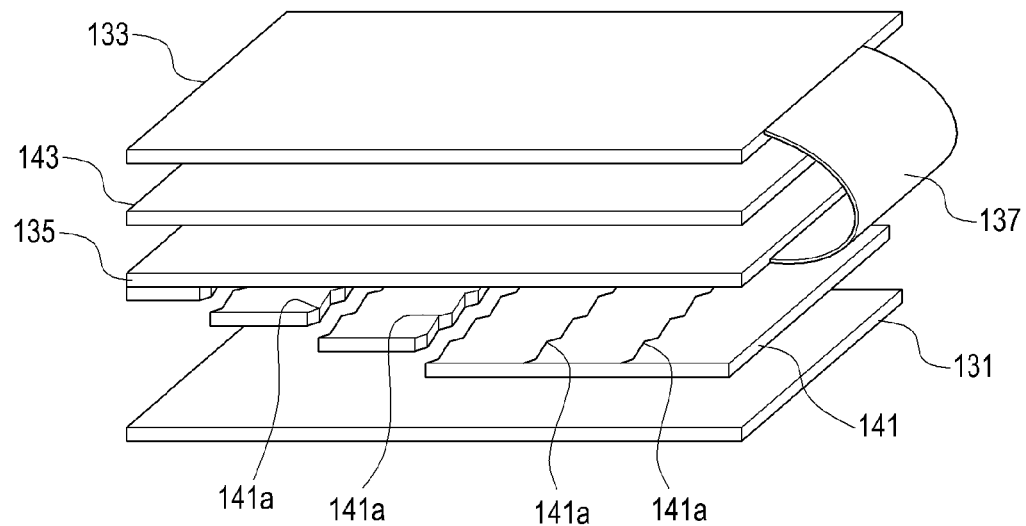
FIG. 13 is a schematic view illustrating an attachment structure of an electronic device according to an embodiment of the present disclosure.

FIG. 13 is a schematic view illustrating an attachment structure of an electronic device according to an embodiment of the present disclosure.

Referring to FIGS. 12 and 13, if the substrate 135 is mechanically or electrically connected to one of the first and second plates 131 and 133, for example, the substrate 135 is connected to one of the first and second plates 131 and 133 via the connection member 137 such as an FPCB, tear lines 143a and 141a may be formed on an attachment layer disposed between the substrate 135 and the other plate 131 or 133.

For example, referring to FIG. 12, if the substrate 135 is mechanically or electrically connected to the first plate 131, the tear line 143a may be formed on the second attachment layer 143. If the cover member 103 is configured to serve as the second plate 133 and touch keys, for example, the substrate 135 is attached to the inner surface of the cover member 102 and a circuit board inside the case member 101 serves as the first plate 131, the substrate 135 may be mechanically or electrically connected to the circuit board (for example, the first plate 131) via the connection member 137. If each of the first and second plates 131 and 133 and the substrate 135 is to be removed for repair or maintenance in the above structure, the substrate 135 may be first removed from the second plate 133, thereby mitigating or preventing damage to the substrate 135. Accordingly, the tear line 143a may be formed on the second attachment layer 143 in the embodiment. According to various embodiments of the present disclosure, the substrate 135 may be configured as a display device and the first plate 131 may be configured as an electromagnetic induction (EMI) touch panel. This touch panel may be mechanically or electrically connected to the display device.

Referring to FIG. 13, the substrate 135 may be mechanically or electrically connected to the second plate 133. For example, the substrate 135 may be configured as a display device and the second plate 133 may be configured as a capacitive touch panel. According to various embodiments of the present disclosure, the touch panel does not need to be always mechanically or electrically connected to the display device. For example, the touch panel and the display device may be connected to a main circuit board of the electronic device 100 in different paths. According to an embodiment of the present disclosure, if a mechanical or electrical path may be simplified, the touch panel may be connected directly to the display device. The first plate 131 which is formed of a heat resistant sheet or a shielding sheet may be disposed under the first attachment layer 141. If the first plate 131 is formed of a heat resistant sheet, the first plate 131 may diffuse or discharge heat generated inside the electronic device 100. If the first plate 131 is formed of a shielding sheet, the first plate 131 may shield an electromagnetic field between the substrate 135, for example, the display device and other electronic parts of the electronic device 100. The first plate 131 may include parts that ensure stable operations of electronic parts inside the electronic device 100.

If the second plate 133 is removed from the first plate 131 with the substrate 135 mechanically or electrically connected to the second plate 133, the substrate 135 may be detached first from the attachment layer between the first plate 131 and the substrate 135, for example, the first attachment layer 141. According to various embodiments of the present disclosure, a plurality of tear lines 141a may be formed on the first attachment layer 141 so that the adhesive force of the first attachment layer 141 may be weaker than the adhesive force of the second attachment layer 143. For example, when the second plate 133 is removed from the first plate 131, the substrate 135 is detached first from the attachment layer between the first plate 131 and the substrate 135, for example, the first attachment layer 141. Therefore, the substrate 135 may be kept stably connected mechanically or electrically to the second plate 133.

Figure 14:
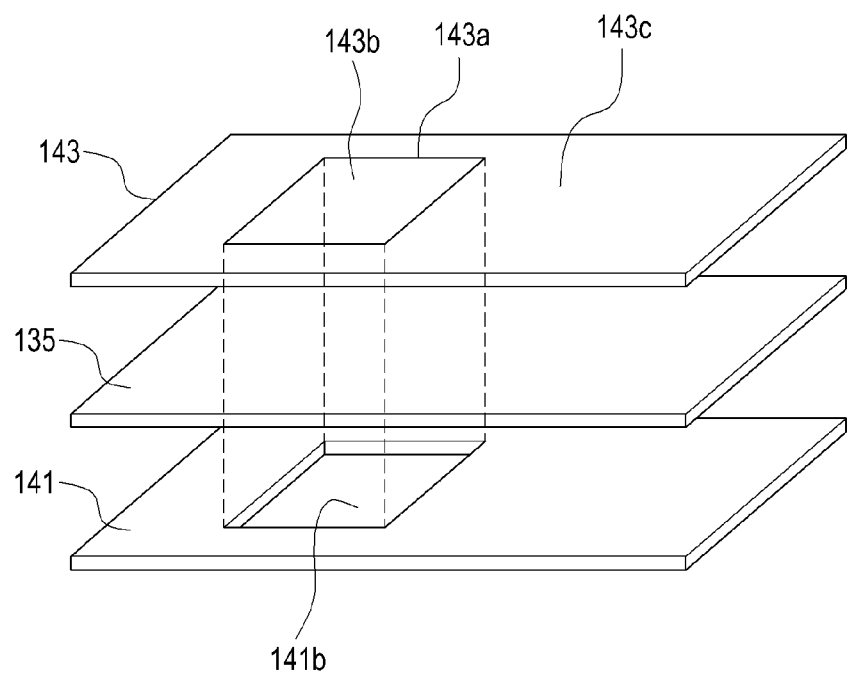
FIG. 14 is a schematic view illustrating an attachment structure of an electronic device according to an embodiment of the present disclosure.

FIG. 14 is a schematic view illustrating an attachment structure of an electronic device according to an embodiment of the present disclosure.

Referring to FIG. 14, an open area 141b may be formed on one of the first and second attachment layers 141 and 143 disposed on both surfaces of the substrate 135 in the attachment structure of the electronic device 100 according to various embodiments. The 'open area' may refer to a partial area of one of the first and second attachment layers 141 and 143, from which an adhesive material forming the first and second attachment layers 141 and 143 is eliminated or a partial area of one of the first and second attachment layers 141 and 143 in which the adhesive material is not coated. If it is necessary to dispose the substrate 135 so that a part of the substrate 135 may directly face the first or second plate 131 or 133, the open area 141b may be formed. In the embodiment of the present disclosure, the open area 141b is formed on the first attachment layer 141, by way of example. If there is a need for inducing the second attachment layer 143 to be first separated in the structure with the open area 141b formed on the first attachment layer 141, a tear line 143a may be formed on the second attachment layer 143.

The tear line 143a may be formed in a closed loop on the second attachment layer 143. The second attachment layer 143 may be divided into the first part 143b surrounded by the tear line 143a and the second part 143c outside the tear line

143*a*. The open area 141*b* may include at least a part of an area of the first attachment layer 141 corresponding to the first part 143*b*. For example, the open area 141*b* may match to the first part 143*b* or may include a smaller area than the first part 143*b*.

According to various embodiments of the present disclosure, one or more tear lines may be formed in the first part 143*b* and/or the second part 143*c*. The number or arrangement of tear lines may be appropriately determined, taking into account a change in an adhesive force provided by each of the first and second attachment layers 141 and 143 during separation of the substrate 135. Even though the open area 141*b*, for example, a non-attachment area is included in the first attachment layer 141, the second attachment layer 143 may be induced to be first detached during separation of the substrate 135 by arranging an appropriate number of tear lines 143*a* in the second attachment layer 143.

According to various embodiments of the present disclosure, if the electronic device 100 includes the display device 127 and the substrate 135 includes a touch key, the substrate 135 may not overlap with the display device 127, as seen from above the first or second plate 131 or 133 (for example, as seen from the front or rear of the electronic device 100). According to various embodiments of the present disclosure, if the electronic device 100 includes the display device 127 and the first or second plate 131 or 133 includes a heat resistant sheet or a shielding sheet, the heat resistant sheet or the shielding sheet may overlap with the whole display device 127, as seen from above the first or second plate 131 or 133 (for example, as seen from the front or rear of the electronic device 100). Thus, the heat resistant sheet or the shielding sheet may diffuse or discharge hear generated from the display device 127 or other electronic parts or shield electromagnetic interference between the display device 127 and other electronic parts. According to various embodiments of the present disclosure, if the electronic device 100 includes the display device 127 and the first or second plate 131 or 133 includes a pressure sensor, the pressure sensor and the substrate 135 may partially overlap with the display device 127, as seen from above the first or second plate 131 or 133 (for example, as seen from the front or rear of the electronic device 100). The pressure sensor may detect pressure applied to the display device 127 and thus generate an input signal corresponding to the detected pressure in a touch input operation performed through the display device 127.

Figure 15:
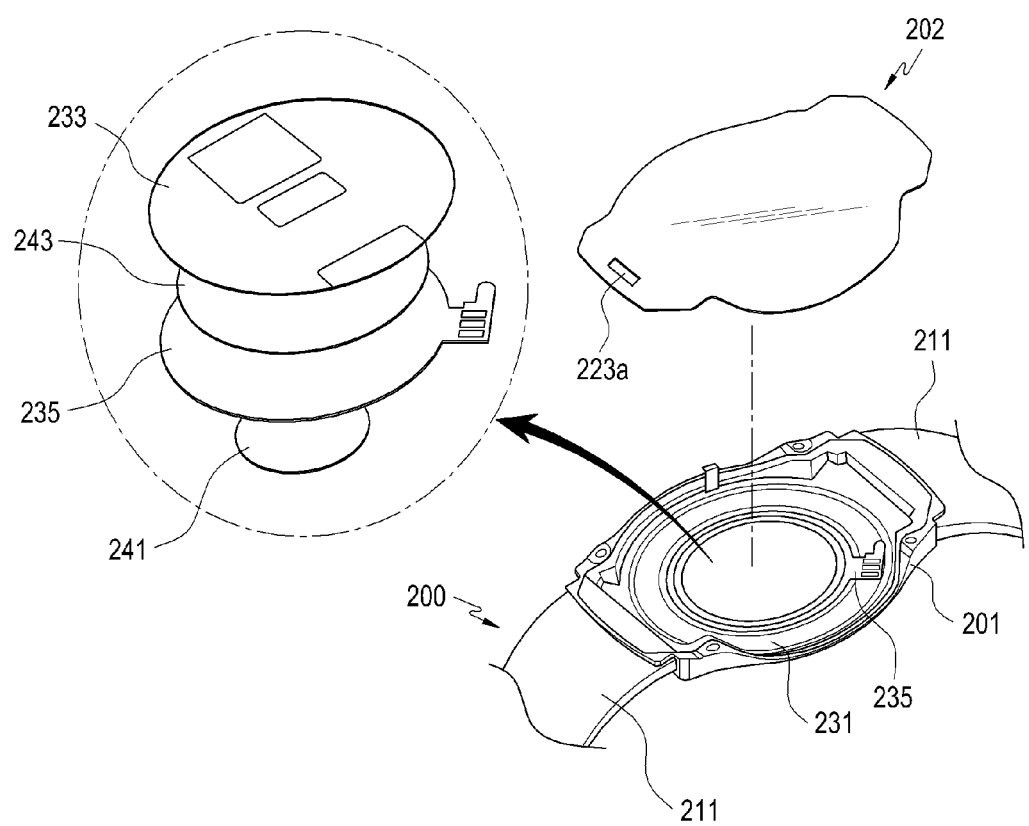
FIG. 15 is an exploded perspective view of an electronic device according to an embodiment of the present disclosure.

FIG. 15 is an exploded perspective view of an electronic device according to an embodiment of the present disclosure.

According to an embodiment of the present disclosure, a stack structure or an attachment structure may also be applicable to a wearable electronic device.

Referring to FIG. 15, an electronic device 200 according to an embodiment of the present disclosure may include a roughly disc-shaped case member 201 with an open front surface and a cover member 202 attached onto the case member 201.

Wearing members 211 may be extended at both sides of the case member 201 in receding directions. For example, a user may wear the electronic device 200 around the user's body, for example, around a wrist using the wearing members 211. The cover member 202 may be engaged with the case member 201, covering the front surface of the case member 201 and forming a body (or housing) of the electronic device 200. Various electronic parts such as a processor, a communication module, a sensor module, a battery, and the like may be accommodated in a space formed inside the body, for example, in an interior space formed by the case member 201 and the cover member 202. The cover member 202 may include a display device on its inner surface and a manipulation member 223*a* disposed near to an edge of its outer surface.

A substrate 235 attached onto a first plate 231, for example, an inner bottom surface of the case member 201 by a first attachment layer 241 and a second plate 233 attached onto the substrate 235 by a second attachment layer 243 may be disposed inside the case member 201. The first plate 231 may be, for example, a part of the case member 201. The substrate 235 may include a secondary coil for wireless charging, an antenna device for wireless communication, and the like. According to various embodiments of the present disclosure, when the user wears the electronic device 200, the case member 201 contacts the user's body. Thus, the substrate 235 may include a sensor for detecting a vital sign (for example, the number of pulses) or an auxiliary sensor (for example, a pressure sensor) for the sensor. The second plate 233 may include a sheet for protecting the substrate 235. For example, the second plate 233 may prevent contact between the substrate 235 and other electronic parts arranged in the case member 201. As the second plate 233 is formed of a shielding sheet or a heat resistant sheet, the second plate 233 may shield electromagnetic interference of the substrate 235.

In the above structure of the electronic device 200, if the substrate 235 needs to be removed, the second plate 233 may be detached from the first plate 231. When the first and second plates 231 and 233 are detached from each other, one of the first and second attachment layers 241 and 243 may be induced to be separated earlier than the other. For example, a tear line (for example, the one or more tear lines 143*a* and 141*a* illustrated in FIGS. 8 to 14) may be formed on the attachment layer to be first detached (in the fabrication process of the electronic device 200). For example, if the substrate 235 is designed to be first detached from the first and second plates 231 and 233 to remove the substrate 235, one or more tear lines may be formed on the first attachment layer 241.

In this manner, when a plurality of parts stacked and attached face to face are disassembled, a designed part may be induced to be first separated or removed by forming one or more tear lines on an attachment layer in the electronic devices 100 and 200 according to various embodiments of the present disclosure. For example, as a tear line is formed on at least a part of attachment layers (or parts attached to each other by the corresponding attachment layer), damage to various parts may be mitigated or prevented during disassembly of the electronic devices 100 and 200 for repair or maintenance.

Figure 16:
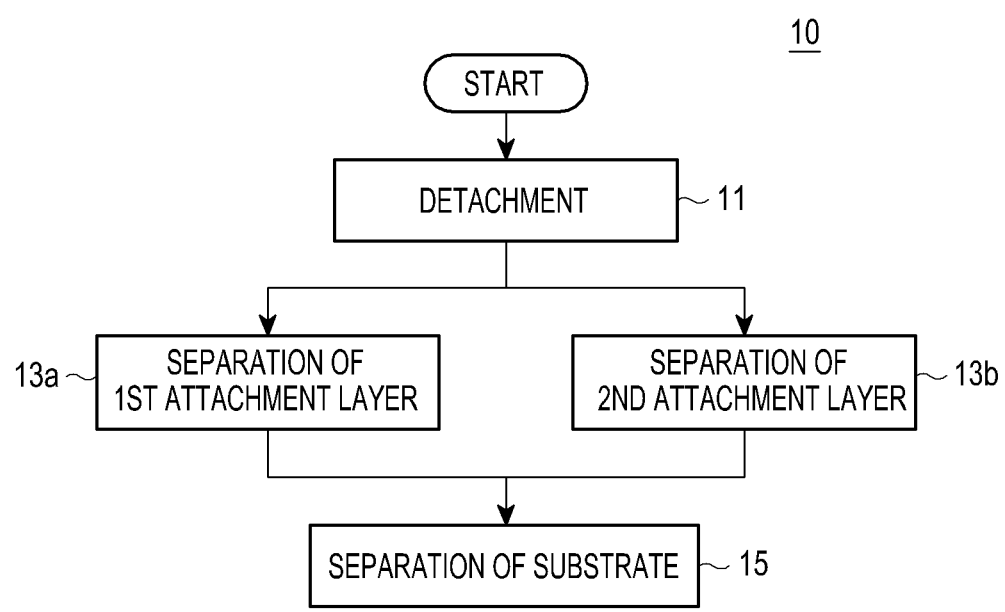
FIG. 16 is a flowchart illustrating a method for disassembling an electronic device according to an embodiment of the present disclosure.

With reference to FIG. 16, a method for disassembling the electronic devices 100 and 200 will be described below.

FIG. 16 is a flowchart illustrating a method for disassembling electronic devices according to various embodiments of the present disclosure.

Referring to FIG. 16, a method 10 for disassembling the electronic devices 100 and 200 according to various embodiments of the present disclosure may include an operation 11 for detaching a plurality of parts, an operation for separating a first attachment layer among the plurality of attachment layers, an operation for separating a second attachment layer among the plurality of attachment layers, and an operation for removing a substrate.

The method 10 is a method for separating at least one part in a structure in which the plurality of parts (for example, the first and second plates 131 and 133 and/or the substrate 135 in FIG. 6) are stacked and attached.

Attachment layers that attach parts (for example, the first and second attachment layers 141, 143, 241, and 243 in FIGS. 6 and 15) may include areas that at least partially overlap with each other.

One of the plurality of attachment layers include a tear line (for example, the tear lines 141a and 143a in FIGS. 12 and 13) and thus may be separated or removed earlier than the other attachment layer(s) during separation of the plurality of parts.

The above disassembly method 10 will further be described in conjunction with the attachment structure of the electronic device. For example, the following description is given in the context that the first plate 131 is a circuit board (or supporting member) disposed inside the case member 101, the second plate 133 is the cover member 102, and the substrate 135 is configured as a touch key, and also in the context that the tear line 143a is formed on the second attachment layer 143 disposed between the cover member 102 and the touch key, by way of example.

The operation 11 for detaching the plurality of parts is performed to separate at least one of the plurality of stacked parts. The operation 11 may include an operation for detaching the first and second plates 131 and 133 from each other in receding directions. The substrate 135 may be attached and fixed between the first and second plates 131 and 133 by the first and second attachment layers 141 and 143 illustrated in FIG. 6. As seen from above the first plate 131, the first and second attachment layers 141 and 143 may overlap with each other at least partially.

In the operation 11 for detaching the first and second plates 131 and 133 from each other at least partially, separations 13a and 13b of the first and/or second attachment layer 141 and/or 143 may start. The sequence of the separations 13a and 13b of the first and second attachment layers 141 and 143 may be determined according to adhesive forces provided by the first and second attachment layers 141 and 143. For example, if the first attachment layer 141 provides a stronger adhesive force than the second attachment layer 143, the operation 13b for separating the second attachment layer 143 may first be performed.

In the operation 13a for separating the first attachment layer 141, the first attachment layer 141 is separated at least partially from the first plate 131 and/or the substrate 135. This operation 13a may be an operation for separating the substrate 135 from the first plate 131. In the operation 13b for separating the second attachment layer 143, the second attachment layer 143 is separated at least partially from the second plate 133 and/or the substrate 135. This operation 13b may be an operation for separating the substrate 135 from the second plate 133. Or the first and second attachment layers 141 and 143 attach and fix the substrate 135 between the first and second plates 131 and 133. According to an embodiment of the present disclosure, the operations 13a and 13b for separating the first and second attachment layers 141 and 143 may be performed simultaneously.

One or more tear lines 143a are formed on the second attachment layer 143. In the operation 11 for detaching the first and second plates 131 and 133 or the operations 13a and 13b for separating the first and second attachment layers 141 and 143, an adhesive force provided by the second attachment layer 143 may be kept weaker than an adhesive force provided by the first attachment layer 141. Therefore, the second attachment layer 143 may first be separated in the operations for separating the first and second attachment layers 141 and 143. For example, the substrate 135 may first be separated from the second plate 143, while being kept attached to the first plate 131.

In the operation 15 for separating the substrate 135, the substrate 135 is separated from the first and/or second plate 131 and/or 133. If the substrate 135 needs to be separated from each of the first and second plates 131 and 133, the substrate 135 may be separated from the first plate 131 in the operation 15 for separating the substrate 135.

The above-described disassembly method 10 may be used when the electronic device 100 needs to be repaired or maintained, for example, when the cover member 102 serving as the second plate 133 needs to be replaced or cleaned. As described before with reference to FIG. 4, if the touch key is separated from the first plate 131, for example, the circuit board or the support member 111, while being attached to the cover member 102 during separation of the cover member 102, the cover member 102 may be kept connected to the case member 101 by the touch key. In this case, it may be difficult to replace or cleanse the cover member 102 and the touch key needs to be separated from the cover member 102 again. Or if the touch key is formed out of an FPCB, the FPCB or an electrical wire formed in the FPCB may be managed inadvertently.

According to various embodiments of the present disclosure, since an attachment layer having a tear line 143a (for example, the second attachment layer 143) is disposed in the electronic device 100, one of attachment layers may first be separated during separation or disassembly of the electronic device 100. Therefore, as parts needing frequent repair or maintenance are first separated during separation or disassembly parts stacked and attached to each other in the electronic device 100, the repair or maintenance may be facilitated and damage to other parts may be mitigated or prevented.

According to various embodiments of the present disclosure, an electronic device may include a housing having at least a part being a first plate and a second plate facing in an opposite direction to the first plate, or including at least one of the first and second plates, a substrate disposed between the first and second plates in substantially parallel with the first and second plates, a first attachment layer disposed between the first plate and the substrate, and a second attachment layer disposed between the second plate and the substrate. When seen from above the first plate, the first and second attachment layers may overlap with each other at least partially, and one of the first and second attachment layers may include at least one tear line extended at least partially across the one attachment layer.

According to various embodiments of the present disclosure, the tear line may include perforations formed on the one attachment layer.

According to various embodiments of the present disclosure, the tear line may include a substantially continuous extended line.

According to various embodiments of the present disclosure, the first and second attachment layers may have different adhesive forces.

According to various embodiments of the present disclosure, the one attachment layer may include a first part surrounded by the at least one tear line and a second part outside the at least one tear line.

According to various embodiments of the present disclosure, the other attachment layer may include an open area in which an adhesive material is removed at least partially in an area corresponding to the first part.

According to various embodiments of the present disclosure, the open area may include an area matching to the first part.

According to various embodiments of the present disclosure, the first plate, the second plate, or the substrate may include at least one of a touch key, a pressure sensor, a heat resistant sheet for distributing heat inside the housing, and a shielding sheet for at least partially shielding an electrical field inside the housing.

According to various embodiments of the present disclosure, the electronic device may further include a display. If the substrate includes a touch key, the substrate may not overlap with the display, when seen from above the first or second plate.

According to various embodiments of the present disclosure, the electronic device may further include a display. If the first or second plate includes a heat resistant sheet or a shielding sheet, the heat resistant sheet or the shielding sheet may overlap with the whole display and the substrate may overlap with a part of the display, when seen from above the first or second plate.

According to various embodiments of the present disclosure, the electronic device may further include a display. If the first or second plate includes a pressure sensor, the pressure sensor and the substrate may overlap with a part of the display, when seen from above the first or second plate.

According to various embodiments of the present disclosure, the electronic device may further include an FPCB for electrically connecting the substrate to one of the first and second plates. The one attachment layer may include an attachment layer disposed between the substrate and the other plate.

According to various embodiments of the present disclosure, the one attachment layer may provide a weaker adhesive force than the other attachment layer.

According to various embodiments of the present disclosure, a method for disassembling an electronic device is a method for disassembling a first plate included in the electronic device, a second plate facing in an opposite direction to the first plate, and a substrate disposed between the first and second plates.

The method may include at least partially detaching the first plate and the second plate from each other, at least partially separating a first attachment layer disposed between the first plate and the substrate from the first plate or the substrate, and at least partially separating a second attachment layer from the second plate or the substrate, the second attachment layer being disposed between the second plate and the substrate and at least partially overlapping with the first attachment layer, when seen from above the first plate. One of the first and second attachment layers may include at least one tear line extended at least partially across the one attachment layer.

The one attachment layer may be separated earlier than the other attachment layer.

According to various embodiments of the present disclosure, the tear line may include perforations formed on the one attachment layer.

According to various embodiments of the present disclosure, the tear line may include a substantially continuous extended line.

According to various embodiments of the present disclosure, the tear line may include a first part surrounded by the tear line and a second part outside the tear line.

According to various embodiments of the present disclosure, the first plate may include a cover member facing a display, the substrate may include a touch key attached to the first plate at one side of the display, and the second plate may include a support member or a circuit board mechanically or electrically connected to the touch key.

According to various embodiments of the present disclosure, the one attachment layer may be formed between the cover member and the touch key.

According to various embodiments of the present disclosure, when seen from above the cover member, the support member, or the circuit board, the touch key may be disposed not to overlap with the display.

As is apparent from the foregoing description of an electronic device and a method for disassembling the electronic device according to various embodiments of the present disclosure, a plurality of attachment layers are included and a tear line is formed on an attachment layer to be first separated. Thus, damage to parts may be mitigated or prevented. For example, as the attachment layer with the tear line provides a weaker adhesive force than one other attachment layer, the attachment layer with the tear line may be first separated during disassembly. Therefore, if attachment layers are provided on both surfaces of a part (for example, both surfaces of a part are attached to other parts), one attachment layer is induced to be first separated by forming a tear line on the attachment layer, thus mitigating a tension applied to a part(s) during disassembly. As a consequence, unnecessary damage to the part(s) is mitigated or prevented during repair or maintenance and service cost or economic burden of a customer caused by damage to parts may be reduced.

While it has been described in the specific embodiments of the present disclosure that the acoustic input module is configured to include one control module and a pair of transducers, by way of example, the present disclosure is not limited thereto. For example, an electronic device according to various embodiments of the present disclosure may include an acoustic input module having one control module and three or more transducers. Thus, the number of transducers may be appropriately determined according to the specification of an acoustic input module required for the electronic device.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a housing providing an interior space;
 a first plate forming a part of the housing or accommodated in the interior space;
 a second plate forming another part of the housing or accommodated in the interior space, the second plate facing in an opposite direction to the first plate;
 a substrate disposed between the first plate and the second plate substantially in parallel with the first plate and the second plate;
 a first attachment layer disposed between the first plate and the substrate; and
 a second attachment layer disposed between the second plate and the substrate,
 wherein, when the first attachment layer and the second attachment layer are seen from above the first plate, the first attachment layer and the second attachment layer overlap with each other at least partially, wherein one attachment layer of the first attachment layer and the second attachment layer includes at least one tear line, wherein the at least one tear line is extended at least partially across the one attachment layer of the first attachment layer and the second attachment layer, and wherein the at least one tear line includes perforations formed on the one attachment layer.

2. The electronic device of claim 1, wherein the at least one tear line includes a substantially continuous extended line.

3. The electronic device of claim 1, wherein the first attachment layer and the second attachment layer have different adhesive forces.

4. The electronic device of claim 1, wherein the one attachment layer includes a first part surrounded by the at least one tear line and a second part outside the at least one tear line.

5. The electronic device of claim 4, wherein another attachment layer of the first attachment layer and the second attachment layer includes an open area in which an adhesive material is removed at least partially in an area corresponding to the first part.

6. The electronic device of claim 5, wherein the open area coincides with the first part.

7. The electronic device of claim 1, wherein the first plate, the second plate, or the substrate includes at least one of a touch key, a pressure sensor, a heat resistant sheet for distributing heat inside the housing, or a shielding sheet for at least partially shielding an electrical field inside the housing.

8. The electronic device of claim 7, further comprising a display, wherein, when the substrate includes the touch key, the substrate does not overlap with the display, while seen from above the first plate or the second plate.

9. The electronic device of claim 7, further comprising a display, wherein, when the first plate or the second plate includes the heat resistant sheet or the shielding sheet, the heat resistant sheet or the shielding sheet completely overlaps the display and the substrate overlaps with a part of the display, when seen from above the first plate or the second plate.

10. The electronic device of claim 7, further comprising a display, wherein, when the first plate or the second plate includes the pressure sensor, the pressure sensor and the substrate overlap with a part of the display, when seen from above the first plate or the second plate.

11. The electronic device of claim 1, further comprising a flexible printed circuit board (FPCB) for electrically connecting the substrate to one of the first plate and the second plate, wherein the one attachment layer includes an attachment layer disposed between the substrate and the other plate of the first plate and the second plate.

12. The electronic device of claim 1, wherein the one attachment layer provide a weaker adhesive force than another attachment layer of the first attachment layer and the second attachment layer.

* * * * *